July 16, 1968  J. L. HENSLEY  3,392,616
OSCILLATING SAWS
Filed Nov. 8, 1965  3 Sheets-Sheet 1
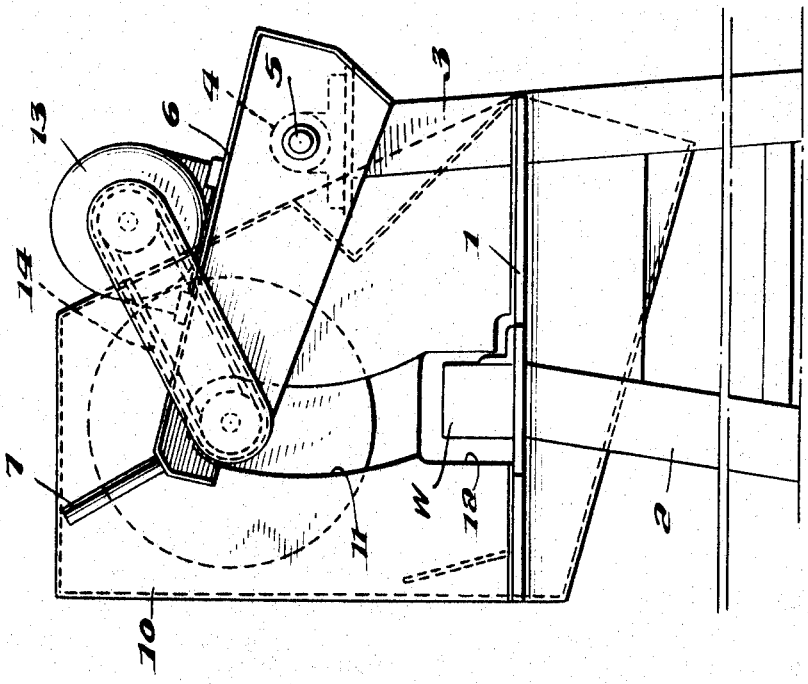
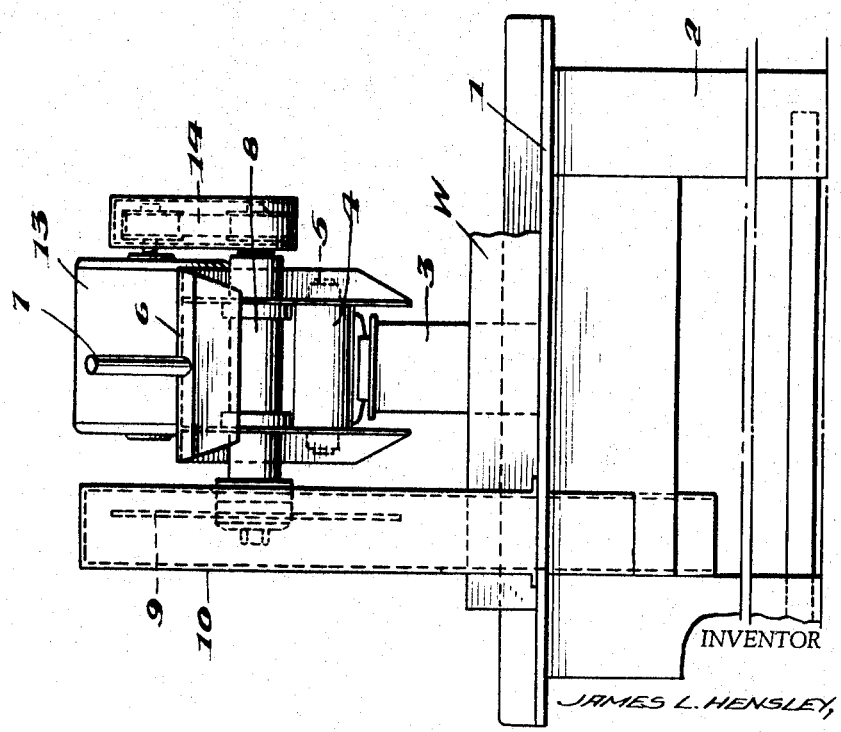
INVENTOR
JAMES L. HENSLEY,
BY
ATTORNEYS

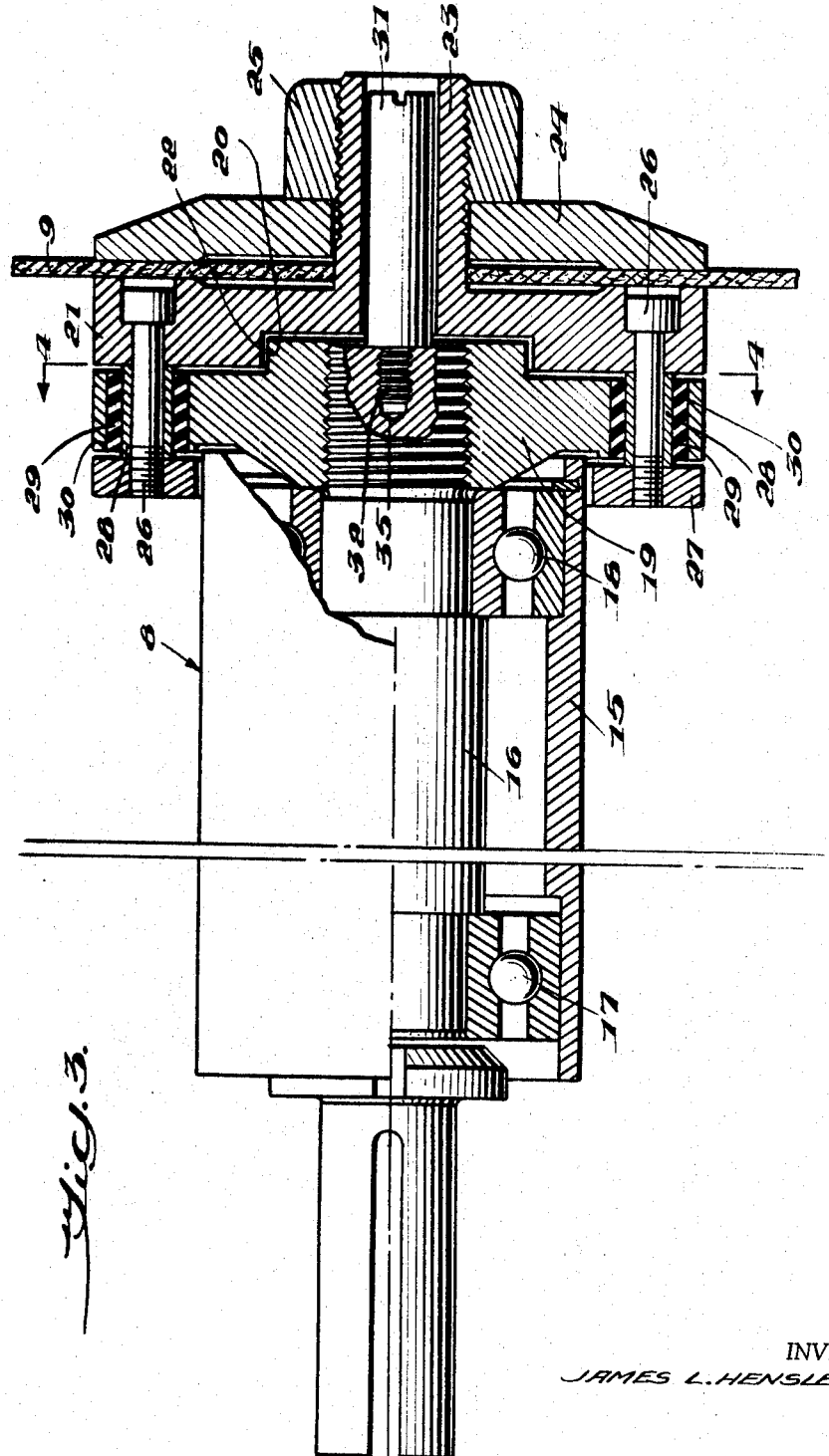

July 16, 1968

J. L. HENSLEY 3,392,616

OSCILLATING SAWS

Filed Nov. 8, 1965

INVENTOR
JAMES L. HENSLEY,

BY

ATTORNEYS

United States Patent Office 3,392,616
Patented July 16, 1968

3,392,616
OSCILLATING SAWS
James L. Hensley, Clinton, Tenn., assignor to Tysaman Machine Company, Inc., Knoxville, Tenn., a corporation of Delaware
Filed Nov. 8, 1965, Ser. No. 506,702
9 Claims. (Cl. 83—666)

ABSTRACT OF THE DISCLOSURE

An oscillating saw of the type used for cutting off bars, tubes and other shapes. The saw has a driven rotary member and a drive rotary member. A saw wheel is mounted on the driven member. The drive member and the driven member have opposed radial faces arranged in close proximity to each other. The driven member is connected to the drive member by a plurality of bolts which limit the axial separation between the members. Resilient bushings in the drive member surround each bolt to provide for radial and rotational oscillation of the saw wheel, while the closeness of the radial faces restricts the driven member to movement in a substantially radial plane. In one embodiment, the hub of the driven member has an adjusting plug for limiting the extent of radial and rotational oscillations.

This invention relates to improvements in Oscillating Saws of the character used for cutting off bars, tubes and other metal forms by a rotating cut-off wheel.

A cut-off saw used for this purpose has required an excessive amount of power for rotating the cut-off member due to the fact that it is operated about a fixed axis. Moreover, excessive wear occurs on the wheel or blade in effecting the required cut through the material. No satisfactory means has been provided heretofore for improving these effects without requiring great expense and complex mechanism.

One object of this invention is to simplify and improve the operating mechanism of a cut-off saw or similar device.

Another object of the invention is to provide for generation of oscillation of the cut-off saw, but of limited amplitude, which is controlled so as to effect an increased working action during operation of the wheel.

Still another object of the invention is to provide for movement of the mounted wheel transversely to the axis of the spindle shaft through a predetermined amplitude of motion regardless of the spindle speed.

These objects may be accomplished, according to one embodiment of the invention, by mounting the wheel which effects the work, such as a cut-off saw wheel for example, on a drive spindle which allowed the mounted wheel to move transversely to the axis of the spindle shaft through a predetermined amount regardless of the spindle speed. This type of arrangement provides for softening or hardening the centering effect of the mounting assemblies for the wheel and permits of changing the amplitude of oscillation or deadening the oscillation according to the character of the work.

The wheel is mounted on an adapter ring which is operatively connected with a drive flange on the spindle shaft through a plurality of yieldable bushings that allow relative radial motion of the adapter ring with respect to the drive flange, but provision is made for controlling the amplitude of such oscillation by shoulder faces or by adjusting plugs spaced according to the desired degree of amplitude to be allowed up to a maximum extent.

Figure 4:
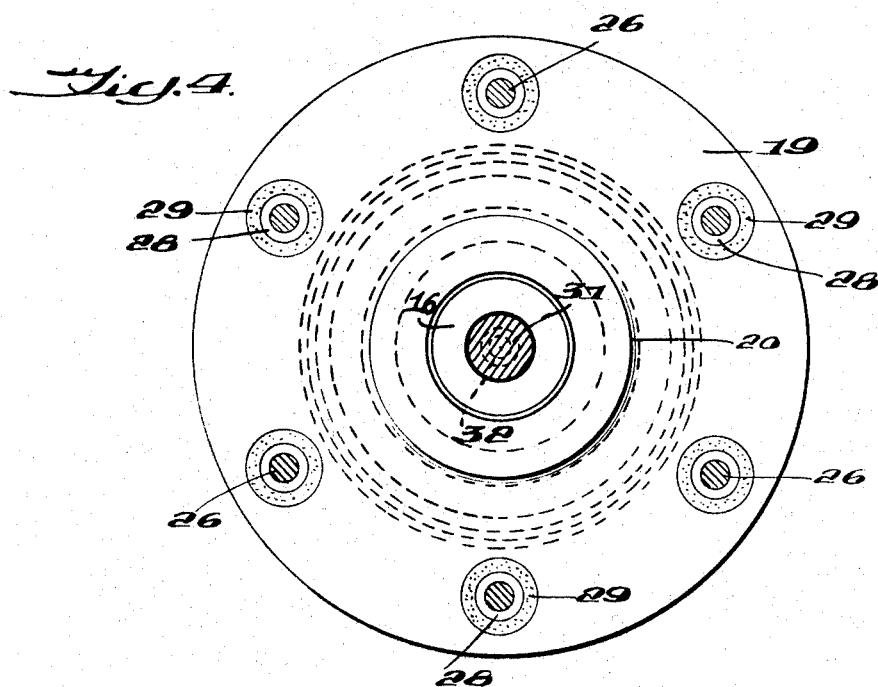
Figure 5:
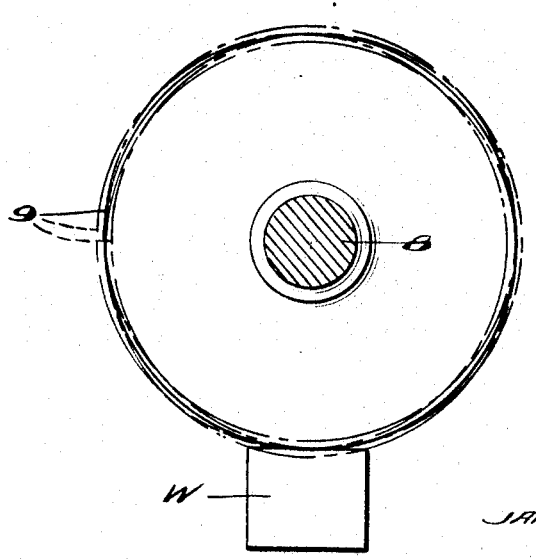

This embodiment of the invention is illustrated in the accompanying drawings, in which:

FIG. 1 is a front elevation of a cut-off saw having the invention incorporated therein;
FIG. 2 is a side elevation thereof;
FIG. 3 is a longitudinal section, partly in elevation, through the spindle;
FIG. 4 is a cross section therethrough on the line 4—4 in FIG. 3; and
FIG. 5 is a diagrammatic view illustrating the oscillating movement of the saw.

The invention is shown in FIGS. 1 and 2 as applied to a cut-off saw having a work table, generally indicated by the numeral 1, and supported on a frame 2 at a proper height for use by a workman standing beside the table. The work is indicated at W, being moved transversely over the surface of the table 1.

A pedestal is shown at 3 upstanding from the table 1, having mounted thereon a bearing block 4 within which is journaled a pivot shaft 5. An arm 6 is mounted at one end on the pivot shaft 5 to swing about the axis thereof under control of the operator through a handle 7 connected with the opposite end of the arm 6. This forward end portion of the arm is capable of being raised or lowered by the operator for operation with respect to the work W.

The forward end portion of the arm 6 carries a spindle assembly, generally indicated at 8, as hereinafter described, upon which is mounted a power tool 9 such, for example, as a cut-off saw, preferably an abrasive cutting disc if the device is used for cutting through metal.

The tool 9 is shown as enclosed within a guard 10 to restrict flying debris, dust and the like and which guard is mounted upon the table 1. The guard is provided with an upright slot 11 in the side thereof toward the spindle assembly 8 to permit the bodily raising and lowering of the spindle assembly upon swinging movement of the arm 6 about the axis of the shaft 5. The guard 10 also has an opening 12 therethrough for passage of the work through the guard over the table 1.

The spindle assembly 8 is shown as operated by a motor 13 mounted on the arm 6 and connected through drive means such as an endless belt 14, with the spindle assembly, acting through the latter to drive the tool, such as the cut-off wheel 9.

The spindle assembly 8 is shown in detail in FIGS. 3 and 4. As here illustrated, the assembly includes a housing 15 having a spindle shaft 16 extending throughout the length of the housing and mounted on suitable bearings 17 and 18. One end of the shaft 16 projects from the housing and is operatively connected with the drive means 14, while the opposite end of the shaft 16 is operatively connected with the wheel 9.

Mounted on the projecting end of the spindle shaft 16 is a drive flange 19 secured in any suitable or desired manner to the end of the shaft as, for example, by screw threaded or splined connection. The drive flange 19 has an axially extending hub portion 20 on the outer face thereof.

An adapter ring 21 extends over the outer face of the drive flange 19 substantially coextensive therewith and having a circular recess 22 in the opposing face thereof receiving therein the hub portion 20 of the drive flange. These portions 20 and 22 are so formed, however, as normally to be spaced apart circumferentially with the spacing therebetween according to the desired maximum degree of amplification of relative movement between the drive flange and the cutting wheel 9.

The adapter ring 21 has an axially extending hub 23 upon which the cutting wheel 9 is mounted against the outer lateral face of the adapter ring 21, being secured thereagainst by a front flange 24 and a nut 25 threaded on the periphery of the hub 23.

The drive flange 19 is connected with the adapter ring 21 in driving relation by means of a plurality of axially extending bolts 26 spaced at intervals therearound, as shown in FIG. 4. Each of the bolts 26 extends through peripheral portions of the drive flange 19 and adapter ring 21 and has threaded connection with a retainer ring 27 beside the drive ring and spaced from the adjacent face thereof.

Each of the bolts 26 is surrounded by a spacer sleeve 28 of a length to extend through the adjacent portion of the drive flange 19 and to project outwardly therefrom so as to hold the adapter ring 21 and the retainer ring 27 spaced from the adjacent portions of the drive flange. Surrounding each spacer sleeve 28 is a bushing 29 preferably formed of suitable cushion material such, for example, as soft rubber.

The bushing 29 extends through a hole 30 in the outer edge portion of the drive flange 19, within which hole is located the rubber bushing 29 and the spacer sleeve 28, as well as connecting bolt 26. One of these connecting assemblies is provided at each of a plurality of points around the peripheral portion of the drive flange 19, six being illustrated in FIG. 4 as are preferably used.

The spacer sleeves 28 are preferably of a length to allow from .001 to .0015 inch clearance between the drive flange 19 and the retainer ring 27 and adapter ring 21. This close clearance allows the wheel 9 to move only in the direction desired relative to the drive flange 19 and the spindle shaft 16. The radial clearance provided between the faces 20 and 22 controls the total amount that the blade 9 can be pushed off center when there is no other limiting force provided.

In this embodiment of the invention I have provided an adjusting plug, indicated generally at 31, extending through the tubular hub 23 and having a threaded end portion 32 screw threaded into the adjacent end of the spindle shaft 16 providing a rigid connection therebetween axially of the shaft. With the adjusting plug 31 located on the axis of the spindle shaft and rigid in relation thereto, this plug 31 is in position to limit the amplitude of oscillation of the adapter ring 21 and therefore the blade 9 relative to the axis of the spindle shaft 16.

The adjusting plug 31 may be made so as to fit precisely the inner diameter of the hub 23, in which event no oscillating movement of the wheel 9 will be permitted and it will be held to operate precisely on the axis of the spindle shaft. However, the adjusting plug 31 may be made somewhat smaller in external diameter than the diameter of the bore in the hub 23, in which event limited oscillation of the adapter ring 21 and therefore of the wheel 9 will be permitted relative to the adjusting plug and therefore of the axis of the drive spindle. By providing a series of adjusting plugs of different diameters, the amplitude of oscillation of the wheel 9 relative to the axis of the spindle shaft may vary from 0 to .060 inch or other amount, as may be desired, up to the maximum amount provided between the shoulders 20 and 22.

The operation of the working tool such, for example, as a cut-off saw or other blade, indicated at 9 in the drawings, will be apparent from the foregoing explanation, taken in connection with FIG. 5 which illustrates an exaggerated oscillating movement of the wheel relative to the work W. The wheel 9 is moved into the work by the operator pulling down on the handle 7, while the spindle speed is operated at a relatively high rate such, for example, as from 1800 to 3450 r.p.m. When the wheel 9 contacts the work W, this will present a resistance to the turning movement of the wheel which will push the wheel off center due to the yielding action provided by the rubber bushings 28. This, in turn, breaks up the arc of contact with the work and thereby generates an oscillating motion of the wheel within the spindle assembly, but without separate oscillating mechanism being provided.

The degree of oscillation will vary according to the thickness of the section being cut. The oscillating movement of the wheel increases the cutting action. The mounted wheel is moved transversely relative to the axis of the spindle shaft, but at a predetermined limited amount regardless of spindle speed. The limiting action controls the degree of oscillation and thereby increases the amplitude thereof.

The adjusting plug provides for easily deadening the oscillation or changing its amplitude as, for example, when cutting different types of sections, such as thin wall sections or large solid bodies. In cutting thin wall sections, the resistance of the blade to the cut is such that the amplitude of the oscillation would be very little or none. However, when cutting heavy solid sections, this force would increase in proportion with an increased oscillating action of the wheel which thereby automatically compensates and produces the desired results.

Provision may be made for softening or hardening the centering effect of the bolt assemblies connecting the drive flange with the adapter ring by changing the durometer of the rubber or by removing some of the bolts as, for example, every other bolt or two opposed bolts.

While the tool is shown as a type to operate radially of the spindle axis, the spindle axis may be turned vertically with the face of the tool acting axially of the spindle as, for example, in a surfacing operation, if desired.

While the invention has been illustrated and described in one embodiment, it is recognized that variations and changes may be made therein without departing from the invention as set forth in the claims.

I claim:

1. A tool of the character described comprising a driving shaft, a drive member mounted on the shaft for rotation about an axis, a driven member adapted to have a work tool connected therewith, said drive member and said driven member having rigid opposed faces extending radially of said axis, said faces being in close proximity to each other, means restricting the axial separation of said opposed faces to allow a clearance therebetween from .001 to .0015 inch, and resiliently yieldable means between said members, said yieldable means resiliently restricting radial oscillatory movement of said driven member relative to the drive member, said faces being movable toward each other upon axial deflection of said yieldable means, whereby the closeness of the spacing between the faces restricts said driven member to movement in a substantially radial plane while allowing radial and rotational oscillation.

2. A tool according to claim 1, wherein the restricting means includes a fastening bolt connected with one of said members and extending axially in interconnected relation with the other, and said resiliently yieldable means includes a yieldable bushing surrounding said fastening bolt between the latter and the drive member.

3. A tool of the character described comprising a driving shaft, a drive member mounted on the shaft for rotation about an axis, a driven member adapted to have a work tool connected therewith, said drive member and said driven member having rigid opposed faces extending radially of said axis, said faces being in close proximity to each other, means restricting the axial separation of said opposed faces, and resiliently yieldable means between said members restricting radial oscillatory movement of said driven member relative to the drive member, said driven member including a hub extending outwardly from said drive member, means for securing a cutting disc coaxially on said hub, said hub having a cylindrical bore therethrough aligned with said axis, a cylindrical plug extending through said bore, means securing one end of said plug to said driving shaft, whereby the radial deflection of said driven member relative to said drive member is limited by the radial distance between the surfaces of said plug and said bore.

4. A tool of the character described comprising a driving shaft, a drive member mounted on the shaft for rotation about an axis, a driven member adapted to have a work tool connected therewith, said drive member and said driven member having rigid opposed faces extending radially of said axis, said faces being in close proximity to each other, means restricting the axial separation of said opposed faces, and resiliently yieldable means between said members restricting radial oscillatory movement of said driven member relative to the drive member, the drive and driven members having axially telescoped portions spaced apart radially for limiting the oscillating movement of the driven member relative to the axis of the drive member.

5. A tool of the character described comprising a driving shaft, a drive member mounted on the shaft, a driven member adapted to have a work tool connected therewith, and means connecting the driven member for oscillating movement relative to the drive member, said driven member having a cylindrical bore therein, and an adjusting plug in fixed relation to the drive member and telescoped in said cylindrical bore for limiting the amount of oscillation relative to the drive member.

6. A tool of the character described comprising a driving shaft, a drive member mounted on the shaft for rotation about an axis, a driven member adapted to have a work tool connected therewith, means connecting the driven member for oscillating movement relative to the drive member, said connecting means including a fastening bolt connected with one of said members and extending axially in interconnected relation with the other, and a yieldable bushing surrounding said fastening bolt between the latter and the drive member, a sleeve telescoped with the yieldable bushing and fixed to the drive member, said sleeve being in abutting relation to the driven member for preventing axial movement therebetween.

7. A tool of the character described comprising a driving shaft, a drive member mounted on the shaft for rotation about an axis, a driven member adapted to have a work tool connected therewith, means connecting the driven member for oscillating movement relative to the drive member, said drive member having a hole therethrough, a bolt connected with the driven member and extending through the hole, a spacer sleeve surrounding the bolt in the hole and extending in abutting relation with the driven member, and a yieldable bushing surrounding said spacer sleeve in the hole.

8. A tool according to claim 7, including a retainer ring fixed to the bolt and in abutting relation with the spacer sleeve.

9. A tool of the character described comprising a driving shaft, a drive member mounted on the shaft for rotation about an axis, a driven member adapted to have a work tool connected therewith, means connecting the driven member for oscillating movement relative to the drive member, said drive member having a flange extending radially of the shaft and the driven member having an adapter ring extending over one face of the flange, said flange having a plurality of holes therethrough, bolts extending through the holes and connected at one end with the adapter ring, a retainer ring at the opposite face of the flange and connected with the bolts, rigid sleeves extending through the holes around the bolts and abutting at opposite ends the adapter ring and the retainer ring limiting axial movement therebetween, sleeves of cushioning material surrounding the rigid sleeves in the holes providing for radial movement between the flange and the adapter ring, and axially telescoped means on the flange and the adapter ring spaced apart radially for limiting relative oscillation.

References Cited

UNITED STATES PATENTS

| 2,441,976 | 5/1948 | Rooney | 144—238 |
| 2,717,478 | 9/1955 | Blum | 51—168 X |
| 2,810,239 | 10/1957 | Burleigh | 51—168 |
| 3,036,412 | 5/1962 | Tocci-Guilbert | 51—168 |

JAMES M. MEISTER, *Primary Examiner.*